United States Patent
Noguchi et al.

(10) Patent No.: US 8,224,074 B2
(45) Date of Patent: Jul. 17, 2012

(54) IMAGE-PROCESSING DEVICE, IMAGE-FORMING DEVICE, AND STORING MEDIUM

(75) Inventors: Nozomi Noguchi, Yokohama (JP); Shinichi Nakamura, Yokohama (JP)

(73) Assignee: Fuji Xerox Co., Ltd., Tokyo (JP)

(*) Notice: Subject to any disclaimer, the term of this patent is extended or adjusted under 35 U.S.C. 154(b) by 475 days.

(21) Appl. No.: 12/570,234

(22) Filed: Sep. 30, 2009

(65) Prior Publication Data
US 2010/0246943 A1 Sep. 30, 2010

(30) Foreign Application Priority Data
Mar. 25, 2009 (JP) ................................. 2009-075179

(51) Int. Cl.
*G06K 9/34* (2006.01)
(52) U.S. Cl. ......... 382/164; 382/162; 382/163; 382/173
(58) Field of Classification Search .................. 382/163, 382/165, 167, 176, 173, 239, 243, 305, 298, 382/317, 164, 162; 358/3.27, 1.9, 518, 512, 358/500, 529; 348/E9.01, 364; 235/454, 235/456; 707/E17.03
See application file for complete search history.

(56) References Cited

U.S. PATENT DOCUMENTS

| | | | | |
|---|---|---|---|---|
| 5,231,482 A | * | 7/1993 | Murakami et al. | 358/500 |
| 5,719,689 A | * | 2/1998 | Terada | 358/529 |
| 8,040,569 B2 | * | 10/2011 | Hashii et al. | 358/3.27 |

FOREIGN PATENT DOCUMENTS
JP 2004-080118 A 3/2004
* cited by examiner

*Primary Examiner* — Anh Hong Do
(74) *Attorney, Agent, or Firm* — Sughrue Mion, PLLC

(57) ABSTRACT

An image-processing device includes: a memory that stores a red range occurring within a color space; an acquisition unit that acquires image data representing a document image that includes characters; and a production unit that produces image data representing an overall image that includes: the document image represented by the image data that is acquired by the acquisition unit, a differentiation image that is positioned within the document image and that allows the user to differentiate an image of red characters residing in the range from an image formed of colors other than red, and an information image representing information for acquiring the document image in a state in which the differentiation image is not positioned.

10 Claims, 6 Drawing Sheets

IMAGE-PROCESSING DEVICE, IMAGE-FORMING DEVICE, AND STORING MEDIUM

CROSS-REFERENCE TO RELATED APPLICATIONS

This application is based on and claims priority under 35 U.S.C. 119 from Japanese Patent Application No. 2009-75179, which was filed on Mar. 25, 2009.

BACKGROUND

1. Technical Field

The present invention relates to an image-processing device, an image-forming device, and a storing medium.

2. Related Art

There are cases in which color perception is irregular, owing to differences in a human being's genetic type or to an eye disorder. In ophthalmology, depending on a presence or absence of abnormalities in red, blue, and green cone cells, the terms trichromatic vision (normal 3-color vision), dichromatic vision (2-color vision), and abnormal trichromatic vision (abnormal 3-color vision) are used.

SUMMARY

In an aspect of the invention, there is provided an image-processing device including: a memory that stores a red range occurring within a color space; an acquisition unit that acquires image data representing a document image that includes characters; and a production unit that produces image data representing an overall image that includes: the document image represented by the image data that is acquired by the acquisition unit, a differentiation image that is positioned within the document image and that allows the user to differentiate an image of red characters residing in the range from an image formed of colors other than red, and an information image representing information for acquiring the document image in a state in which the differentiation image is not positioned.

BRIEF DESCRIPTION OF THE DRAWINGS

Exemplary embodiments of the present invention will now be described in detail based on the following figures, wherein.

DETAILED DESCRIPTION

A retina in an eye of a typical person with color vision contains 3 types of cones—L cones, M cones, and S cones—that are associated with different perceptions (spectral sensitivity), depending on a wavelength of incoming light. On the other hand, a person with dichromatic vision or abnormal trichromatic vision has different cone types or spectral sensitivity from a typical person with color vision, and due to an absence of information used for differentiating each of a hue of, for example, red, yellow, and blue, colors can be discriminated based only on differences in saturation and/or brightness. Cases of dichromatic vision and abnormal trichromatic vision each have a variety of characteristics; for example, there are cases in which it is difficult to differentiate red from achromatic colors, such as black, due to an inability to recognize red hues. In documents presenting information such as written text, red is used to modify important contents, emphasized contents, contents requiring a viewer's attention, and the like. Therefore, if a user is unable to discriminate red from other colors, there are many cases in which difficulties are encountered when viewing documents, and the like. Exemplary embodiments of the present invention will now be described below with an example of a document modified using red. It is to be note here that "red" as used in the following descriptions refers to any color expressed within a (R, G, B) range of (220-255, 0-55, 0-55) where each primary color is expressed in 8 bits (256 tones) in a RGB color space, and is a type of additive color mixture for recreating a wide range of colors by mixing the 3 primary colors of red, green, and blue. In addition, in the present exemplary embodiment, in cases in which the expression "A-B" is used to represent a range from A to B, the expression is defined as a range from A or above up to B or below.

(A) First Exemplary Embodiment (A-1) Configuration

Figure 1:
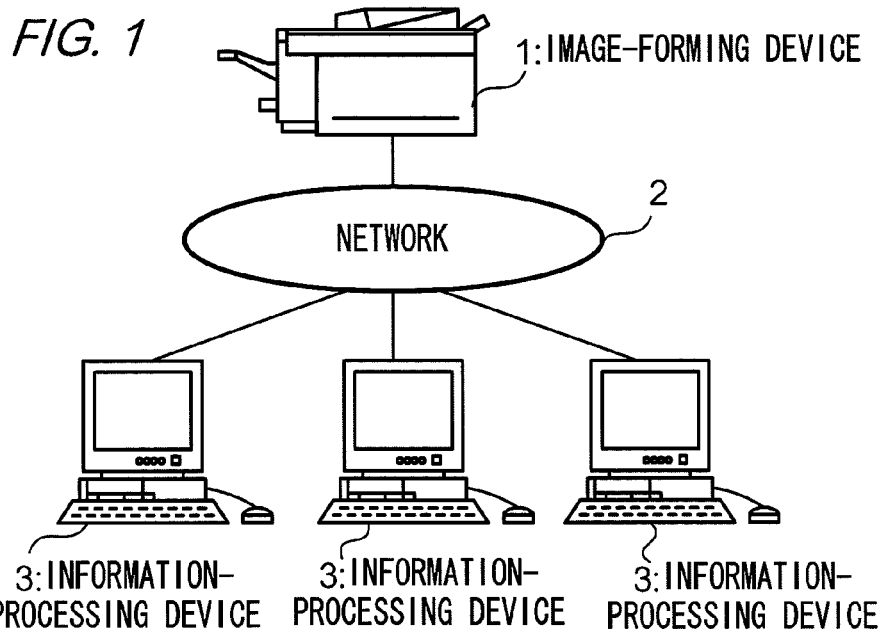
FIG. 1 is a diagram showing an overall configuration of a system related to an exemplary embodiment of the present invention.

FIG. 1 is a diagram showing an overall configuration of a system related to the present exemplary embodiment. Image-forming device 1 and information-processing device 3 are connected through network 2, which is a communication network for transmitting information, such as a WAN (Wide Area Network) or a LAN (Local Area Network). Image-forming device 1 is a device which integrates functions such as, for example, copying, printing, and scanning, and one which also forms an image on a sheet of recording medium such as a paper and reads an image from a sheet of recording paper. Information processing device 3 is, for example, a personal computer that performs various image processes and feeds image-forming device 1 with image data through network 2, instructing image-forming device 1 to form an image corresponding to that image data. In addition, FIG. 1 shows one device that is image-forming device 1 and three devices that are each information-processing device 3. However, a number of image-forming devices 1 and information-processing devices 3 connected to network 2 are not limited to these numbers.

Figure 2:
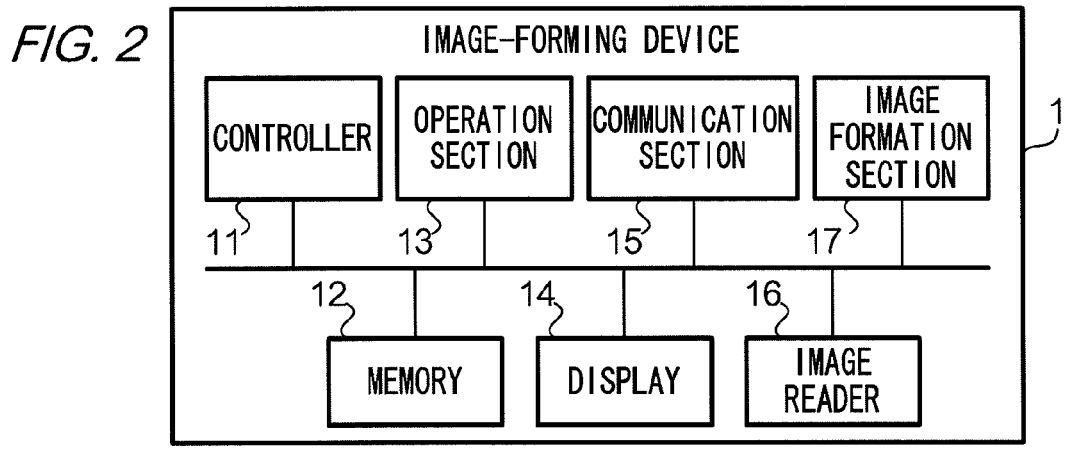
FIG. 2 is a block diagram showing a configuration of image-forming device 1 related to the exemplary embodiment.

FIG. 2 is a block diagram showing a configuration of image-forming device 1. Image-forming device 1 includes controller 11, memory 12, operation section 13, display 14, communication section 15, image reader 16, and image formation section 17. Controller 11 includes a CPU (Central Processing Unit), a ROM (Read Only Memory), and a RAM (Random Access Memory), and the CPU controls each section of image-forming device 1 by executing programs stored in the ROM or memory 12. Within the ROM are encoded analysis programs and the like for the CPU to analyze an information image (described below) included in an image and obtain the analysis results. Memory 12 is a nonvolatile auxiliary memory device, such as a HD (Hard Disk), that stores various programs and data. Operation section 13 includes multiple keys, accepts operations performed by a user, and feeds signals corresponding to those operations to controller 11. Display 14 includes a VRAM (Video RAM), a liquid crystal display, and a liquid crystal driving circuit, and based on information fed from controller 11, it displays either a status of a process or guidance information for a user regarding an operation. Communication section 15 includes a communication circuit and/or a communication interface and communicates with information-processing device 3 via network 2. Image reader 16 includes an optical member configured with CCDs (Charge Coupled Devices), and it reads an image formed on a sheet of recording paper via the optical member, producing image data that represents the read image. Image formation section 17 includes a photoreceptor drum that is an image-holding body, an exposure section that forms an electrostatic latent image, a developing section that develops the electrostatic latent image and forms a toner image, a transfer section that transfers the toner image to a sheet of recording paper, and a fixing section that fixes the toner image that has been transferred to the sheet of recording paper on that sheet of recording paper. Image formation section 17 is an example of an image formation unit that forms an image on a sheet of recording paper in response to image data produced by image reader 16 or image data received through communication section 15.

Figure 3:
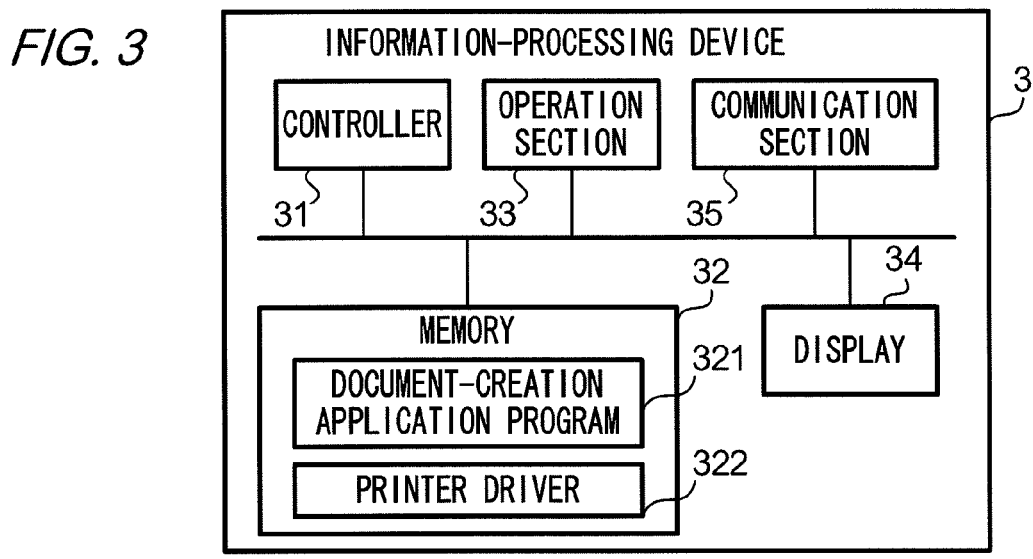
FIG. 3 is a block diagram showing a configuration of an information-processing device 3 related to the exemplary embodiment.

FIG. 3 is a block diagram showing a configuration of information-processing device 3. Information-processing device 3 includes controller 31, memory 32, operation section 33, display 34, and communication section 35. Controller 31 includes a CPU (Central Processing Unit), a ROM (Read Only Memory), and a RAM (Random Access Memory), and the CPU controls each section of information-processing device 3 by executing programs stored in the ROM or memory 32. Operation section 33 includes an operation device, such as a keyboard and a mouse, accepts operations performed by a user, and feeds signals corresponding to those operations to controller 31. Display 34 includes a display device, such as a CRT (Cathode Ray Tube) display or a liquid crystal display, and displays various types of information based on image data fed from controller 31. Communication section 35 includes a communication circuit and/or a communication interface and communicates with image-forming device 1 via network 2.

Memory 32 is a nonvolatile auxiliary memory device, such as a HD (Hard Disk), and stores various programs and data. The programs stored in memory 32 include: document-creation application program 321 encoded with procedures for creating, saving, and editing document image data representing a document that expresses characters, graphics, and/or tables in multiple colors; and printer driver 322 encoded with a processing procedure for converting the document image data into image data expressed in a page description language that can be interpreted by image-forming device 1. Printer driver 322 is encoded with a red range with (R, G, B) values of (220-255, 0-55, 0-55) in the RGB color space. In other words, memory 32, in which printer driver 322 is stored, is an example of a memory that stores a red range.

Moreover, printer driver 322 is encoded with a procedure for a process (hereinafter referred to as the "emphasis response process") for allowing a person with dichromatic vision or abnormal trichromatic vision to recognize locations that have been emphasized, etc., within the document image data that has been created through the execution of document-creation application program 321 by a user, in which locations have been modified with red for the purpose of emphasis or the like. The emphasis response process makes it easy to discriminate red that is used for the purpose of emphasis or the like from other colors (typically black, which is generally the most frequently used color in documents) by modifying characters represented in red (hereinafter referred to as "red character strings") within the document image data. More specifically, this modification is a process that forms a segment image below the lower edge of a rectangular area circumscribing the red character strings. This modification shall hereinafter be referred to as "underlined character trimming."

By implementing this type of emphasis response process, document image data in which the contents of the document image data of the original document have been partially modified, or document image data representing a document image in which underlined character trimming has been implemented below the red character strings, is produced. However, in order for the user to know whether this type of underlined character trimming has been implemented within the document image, it is necessary to closely check the contents of the document image; for example, looking at the cover sheet section or a part of the contents of the document image may not be sufficient. In addition, because this underlined character trimming is implemented for persons with dichromatic vision or abnormal trichromatic vision, if, for example, a typical person with color vision uses this document image, there are also cases in which it is desirable to erase the underlined character trimming from the document image and restore the contents of the document image to the original document. Here, the "original document" is the document image data that has been created through the execution of document-creation application program 321 by a user, and it refers to the state in which the emphasis response process has not been implemented. Consequently, printer driver 322 is encoded with a process for notifying a user whether underlined character trimming has been implemented within the document image, as well as a process for erasing the underlined character trimming from the document image and restoring the document image to its original state.

Figure 4:
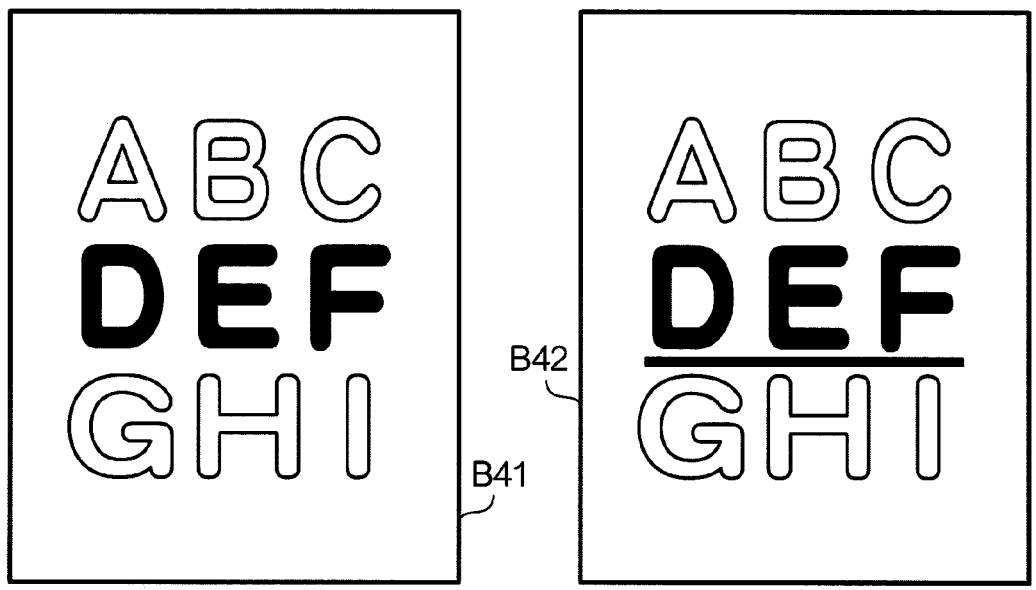
FIG. 4 is an explanatory diagram of an emphasis response process related to the exemplary embodiment.

FIG. 4 is an explanatory diagram for underlined character trimming. The document images shown in FIG. 4 are each document images formed based on the same document image data, and they express characters represented in red as solid characters and characters represented in colors other than red, such as black, as outline characters. Moreover, document image B41 is a document image in which underlined character trimming has not been implemented and document image B42 is a document image in which underlined character trimming has been implemented. In document image B42, underlined character trimming has been implemented for the character string (DEF) represented in red.

(A-2) Operation

The user causes information-processing device 3 to execute document-creation application program 321 and operates operation section 33 while referring to display 34 to create a document. At this time, the user may operate operation section 33 to instruct information-processing device 3 to render characters at certain locations within the document in red for emphasis, etc. Controller 31 creates document image data representing the document in a memory, such as a RAM, in response to the user operation and in accordance with the procedure encoded in document-creation application program 321. In this way, controller 31 is an example of an acquisition unit that acquires document image data by creating and storing document image data. Then, when the user operates operation section 33 and issues an instruction to print out the created document, controller 31 operates printer driver 322 and starts the process shown in FIG. 5.

Figure 5:
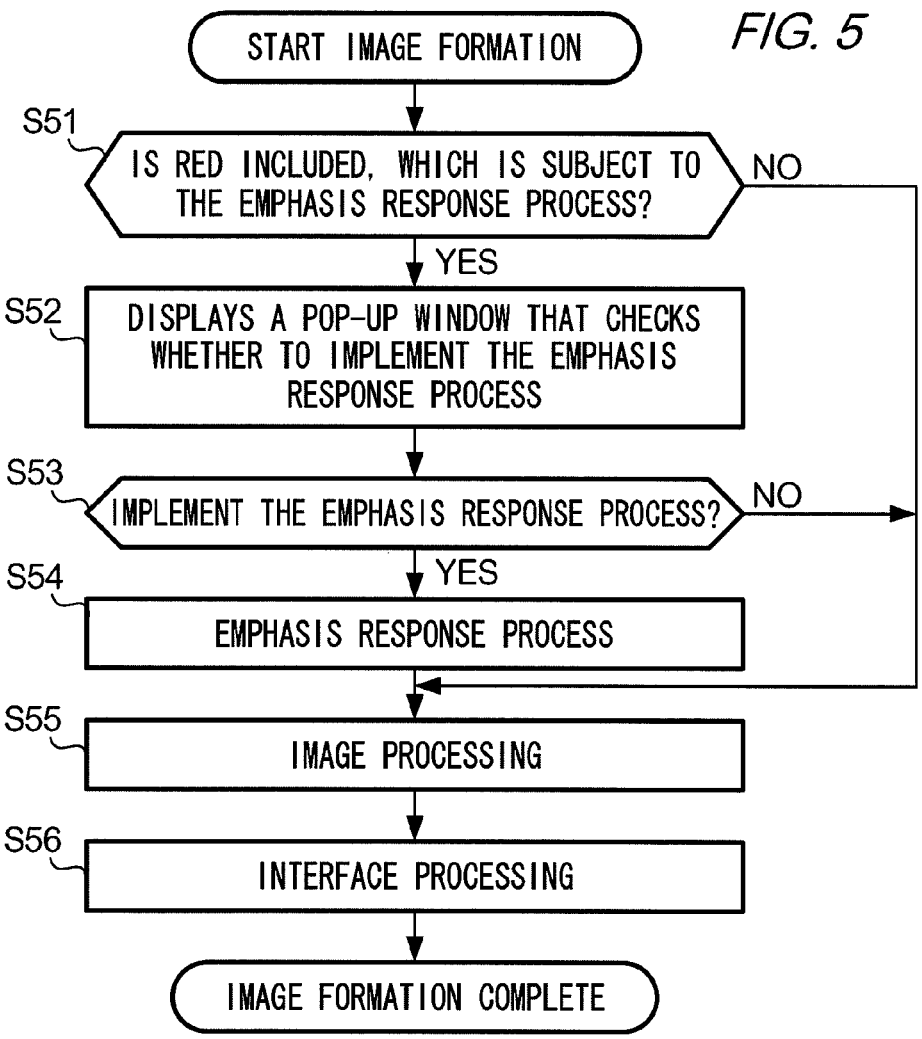
FIG. 5 is a flowchart describing operation of an emphasis process of information-processing device 3 related to the exemplary embodiment.

In FIG. 5, controller 31 analyzes the document image data and judges whether the data includes any red portions that would be subject to the emphasis response process (step S51). The document image data includes color information representing a variety of colors in order to express characters, graphics, and/or tables as images. Controller 31 can specify locations within the document image data that are to be subjected to the emphasis response process by crosschecking this color information with the red range encoded in printer driver 322. If controller 31 judges that red is present (step S51; YES), it displays a pop-up window on display 34 to cause the user to confirm whether to implement the emphasis response process (step S52). The pop-up window has radio buttons that provide options for selecting the alternatives of whether to implement the emphasis response process. By selecting one of the radio buttons the user can select whether to implement the emphasis response process (step S53). Here, we will assume that the user selects the radio button for implementing the emphasis response process (step S53; YES). As a result, controller 31 implements underlined character trimming for the red character strings included in the document image data as part of the emphasis response process, and in addition, it produces document image data in which an information image representing information for erasing the underlined character trimming is positioned in a predetermined area within the document image (step S54). In other words, the document image data that is produced at this time is image data representing an overall image that includes: a document image represented by the image data that is acquired in the beginning; an image with the underlined character trimming that is the differentiation image for allowing the user to differentiate red character strings from non-red character strings within this document image; and an information image representing information for acquiring the document image in a state in which the underlined character trimming has not been positioned. In other words, the controller 31 is an example of a production unit that produces image data representing an overall image that includes a differentiation image and an information image.

Then, controller 31 implements image processing to convert the document image data that has undergone the emphasis response process into image data expressed in a page description language that can be processed by image-forming device 1 (step S55). Next, controller 31 transmits the image data from communication section 35 to image-forming device 1 (step S56). Then, when communication section 15 of image-forming device 1 receives the image data from information-processing device 3, controller 11 analyzes and bitmaps the contents of that image data and controls image formation section 17 to cause it to form the image on a sheet of recording paper. In addition, in step S51, if controller 31 judges that no characters represented in red are present (step S51; NO), it skips the processes in steps S52-S54 and proceeds to the image processing of step S55. Now, let us assume that in step S53, the radio button for canceling the implementation of the emphasis response process is selected (step S53; NO). In this case, controller 31 skips the process of step S54 and proceeds to the image processing of step S55.

Figure 6:
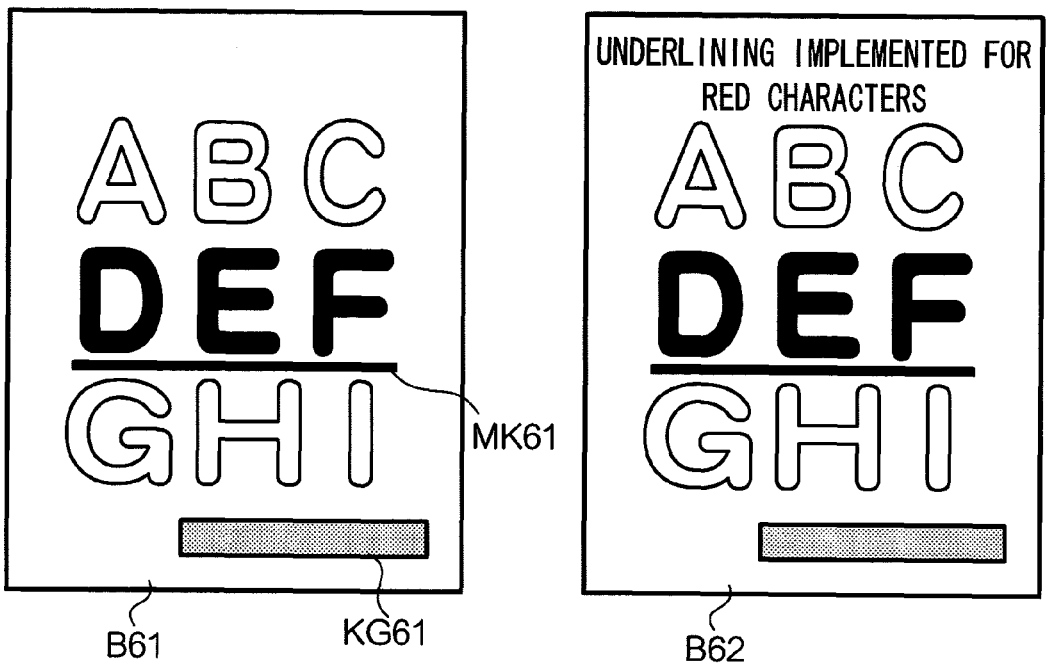
FIG. 6 is an explanatory diagram of an emphasis response process related to the exemplary embodiment.

FIG. 6 is an explanatory diagram of an emphasis response process. In FIG. 6, the characters represented in red and the characters represented in colors other than red, such as black, that are included in document image B61 are expressed as solid characters and outline characters, respectively. Underlined character trimming MK61 is positioned beneath the red character string (DEF) within document image B61, and furthermore, information image KG61 is positioned at the lower end of the document. Information image KG61 is an image encoded with information indicating that "underlining has been implemented for the red characters." Document image B61 includes: a document image represented by the image data; an underlined character trimming image that is the differentiation image for allowing the user to differentiate the red character strings from the non-red character strings within that document image; and an information image representing the information for acquiring the document image in a state in which the underlined character trimming has not been positioned, and therefore, it corresponds to an "overall image," or an image with all of these elements. Controller 31 of information-processing device 3 implements the process of encoding the information image by executing an encoding routine encoded in printer driver 322. Information image KG61 is an aggregate of halftone images formed using a transparent toner that is colorless and transparent, or a color toner with low visibility (e.g., yellow or cyan), and the encoded information is expressed according to the mutual positional relationships (positioning pattern) of each of the halftone images. Moreover, within this positioning pattern of the halftone images is included a predetermined pixel pattern indicating that these halftone images are information images. Controller 11 of image-forming device 1 can recognize that these are information images by detecting this predetermined pixel pattern.

If document image B61 is being copied, information image KG61 is read by image reader 16 of image-forming device 1, the contents are analyzed by controller 11, and processes corresponding to the analysis results are implemented.

Figure 7:
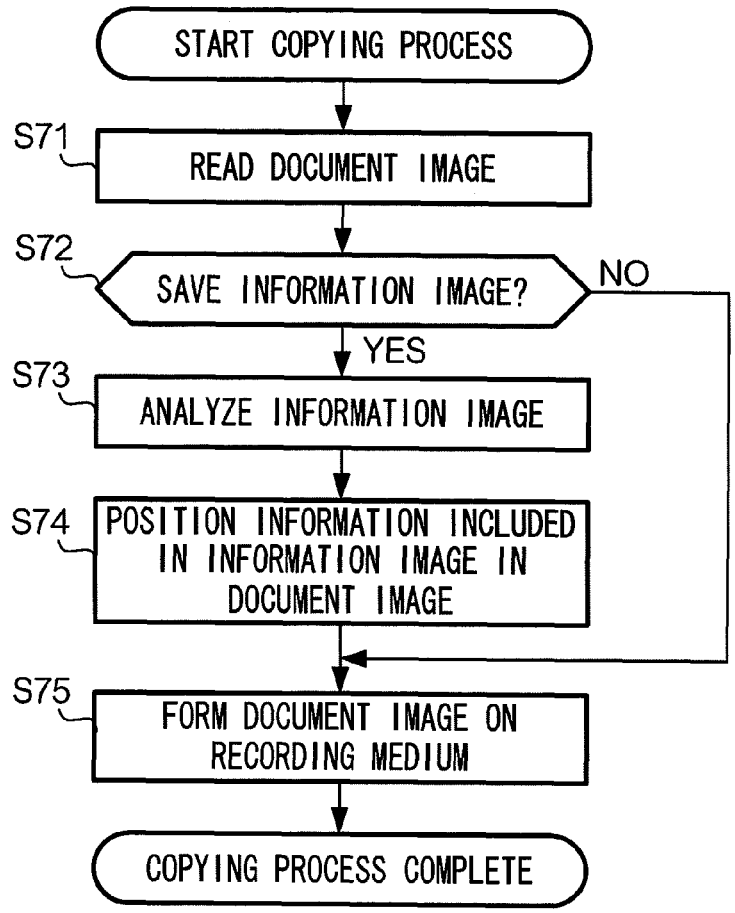
FIG. 7 is a flowchart describing operation of a copying process of image-forming device 1 related to the exemplary embodiment.

FIG. 7 is a flowchart describing operation of a copying process in image-forming device 1. First, the user operates operation section 13 of image-forming device 1 to select the "copying process" and causes image reader 16 to read document image B61 of FIG. 6, which has been formed on a sheet of recording paper (step S71). Based on the bit-level pixel information read by image reader 16 by scanning document image B61, controller 11, by executing a program that has been pre-encoded in the ROM, determines whether a pixel pattern indicating information image KG61 is included (step S72). If controller 11 determines that a pixel pattern indicating information image KG61 is present (step S72; YES), it extracts the information represented by information image KG61. Next, controller 11 analyzes the retrieved information to extract information indicating that "underlining has been implemented for the red characters" (step S73). Then, controller 11 produces document image data in which an image, expressing in characters the information indicating that "underlining has been implemented for the red characters" that has been extracted from information image KG61, is positioned at a preset location (step S74), and forms the document image corresponding to that document image data on a sheet of recording paper (step S75). Document image B62 of FIG. 6 is a document image formed through this copying process. If the user views the document image obtained through the copying process of image-forming device 1, the character string indicating that "underlining has been implemented for the red characters" will be seen, and it will be understood that trimming has been implemented via the emphasis response process. In addition, the position of the image indicating that "underlining has been implemented for the red characters" can be any position that does not negatively affect the visibility of the document image. Moreover, in step S72, if controller 11 determines that a pixel pattern indicating information image KG61 is not present (step S72; NO), it skips the processes in steps S73 and S74 and proceeds to the process of forming the document image of step S75 on a sheet of recording paper.

The user refers to the sheet of recording paper on which document image B62 has been formed to determine whether the underlined character trimming has been implemented for the red character strings in this document, and in such a case, it may be desirable to erase the underlined character trimming from this document. In such cases, controller 11 of image-forming device 1, in accordance with an instruction from the user, executes a restoration process to restore the document image for which the emphasis response process has been implemented back to the document image of the original document from the time before the emphasis response process is implemented. Controller 11 of image-forming device 1 executes a program that is pre-encoded in the ROM to execute this restoration process.

Figure 8:
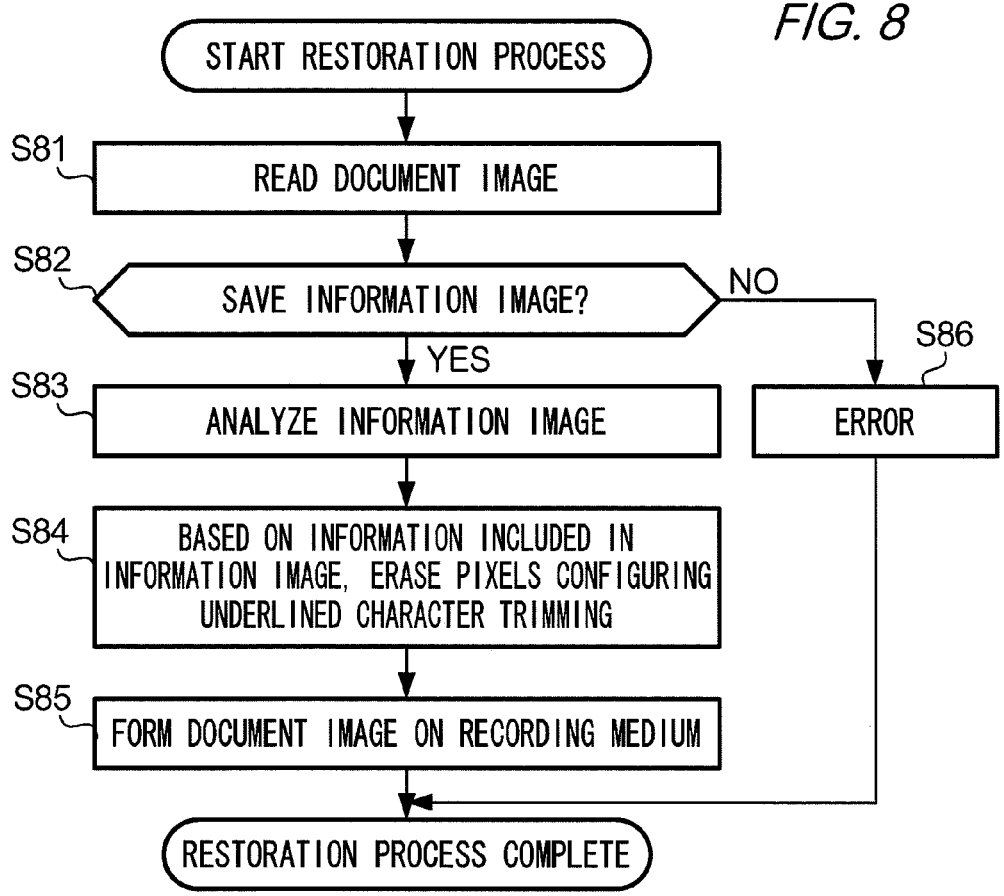
FIG. 8 is a flowchart describing operation of a restoration process of image-forming device 1 related to the exemplary embodiment.

FIG. 8 is a flowchart describing operation of a restoration process of image-forming device 1. Here, a case is assumed in which the restoration process is implemented for document image B61 of FIG. 6. First, the user operates operation section 13 of image-forming device 1 to select the "restoration process" and cause image reader 16 to read document image B61 of FIG. 6, which has been formed on a sheet of recording paper (step S81). Controller 11 is an example of a first acquisition unit that acquires image data representing an overall image, which includes an image of the actual document included in document image B61, a differentiation image, and an information image. Based on the bit-level pixel information read by image reader 16 by scanning document image B61, controller 11 determines whether a pixel pattern indicating information image KG61 is present (step S82). If controller 11 determines that a pixel pattern indicating information image KG61 is present (step S82; YES), it retrieves the information represented by information image KG61. Next, controller 11 specifies that the emphasis response process is a process in which "underlining has been implemented for the red characters" by analyzing the information included in information image KG61. Then, controller 11 analyzes the document image data to specify the area of a red character string and extracts the positional information, which consists of the origin coordinates and the end-point coordinates of the underlined character trimming beneath the red character string (step S83). By specifying that the emphasis response process is a process in which "underlining has been implemented for the red characters" and also specifying the positional information of the underlined character trimming beneath the red character string, controller 11 can specify that the segment image located at the position represented by the positional information should be erased, thereby specifying the details of a process for erasing the differentiation image, which is the underlined character trimming. In other words, controller 11 is an example of a specification unit. Furthermore, by deleting the pixels configuring the underlined character trimming specified by this positional information from the document image data, controller 11 produces document image data corresponding to the original document (step S84). In other words, controller 11 is an example of a production unit that produces image data in which, based on the positional information of the underlined character trimming specified in step S83, the differentiation image has been erased from the overall image acquired by image reader 16. Then, controller 11 forms an image corresponding to the document image data on a sheet of recording paper (step S85). Document image B41 of FIG. 4 is a document image formed by the restoration process. In addition, in step S82, if controller 11 determines that a pixel pattern indicating information image KG61 is not present (step S82; NO), it stops the restoration process by inferring that an error has occurred (step S86).

(B) Second Exemplary Embodiment

In a second exemplary embodiment, the information image positioned in the document image indicates the storage location in which the document image data of the original document is stored, and image-forming device 1 acquires the document image data of the original document from that storage location.

(B-1) Configuration

A configuration of the second exemplary embodiment features the following differences from the first exemplary embodiment.

Figure 9:
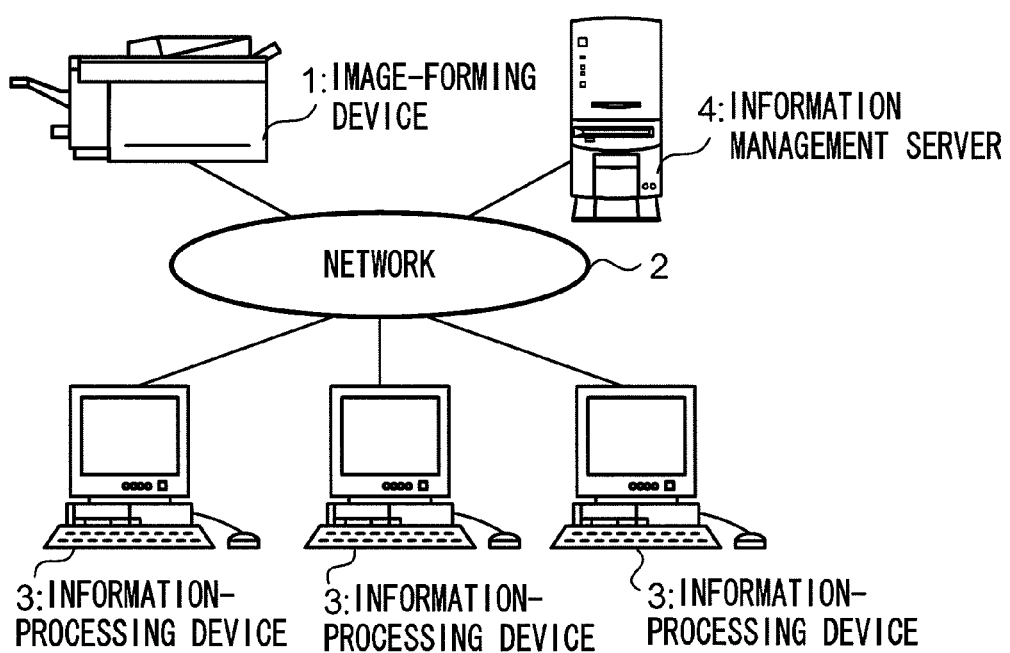
FIG. 9 is a diagram showing an overall configuration of a system related to the exemplary embodiment.

FIG. 9 is a diagram showing the overall configuration of a system according to the second exemplary embodiment. Network 2, which is a communication network for transmitting information from a WAN (Wide Area Network), LAN (Local Area Network), or the like, is connected to information management server 4 in addition to image-forming device 1 and information-processing device 3, which are described in the first exemplary embodiment. As mentioned above, the user causes information-processing device 3 to execute document-creation application program 321 and operates operation section 33 while referring to display 34 to create a document, but the document image data corresponding to the original document produced by information-processing device 3 at this time is transmitted to information management server 4 through network 2 along with a document ID that has been assigned to that document image data. Information management server 4 stores the original document of the document image data that has been received through this process. Information management server 4 manages this document image data by assigning each document image data object to a folder within a tree-like configuration based on document IDs that are assigned to each individual document image data. The "storage address" hereafter refers to an indicator of a memory location within the memory area of information management server 4 where the document image data is stored. Information management server 4 notifies information-processing device 3 of the storage addresses and the document IDs. FIG. 9 shows one device that is information device 1, three devices that are information-processing device 3, and one device that is information management server 4. However, the number of image-forming devices 1, information-processing devices 3, and information management servers 4 connected to network 2 are not limited to these numbers.

(B-2) Operation

Operation of the second exemplary embodiment features the following differences from the first exemplary embodiment.

First, in step S54 of FIG. 5, controller 31 of information-processing device 3 positions on the document image an information image that has been produced by encoding both the document ID of the document image data that is subject to the emphasis response process and the storage address in information management server 4 where the document image data is stored. As described above, the document ID and the storage address are items received from information management server 4.

Following is a description of a process for acquiring, based on the information image positioned on the document image, the document image data of the original document from the information management server 4 when the image-forming device 1 restores the document.

Figure 10:
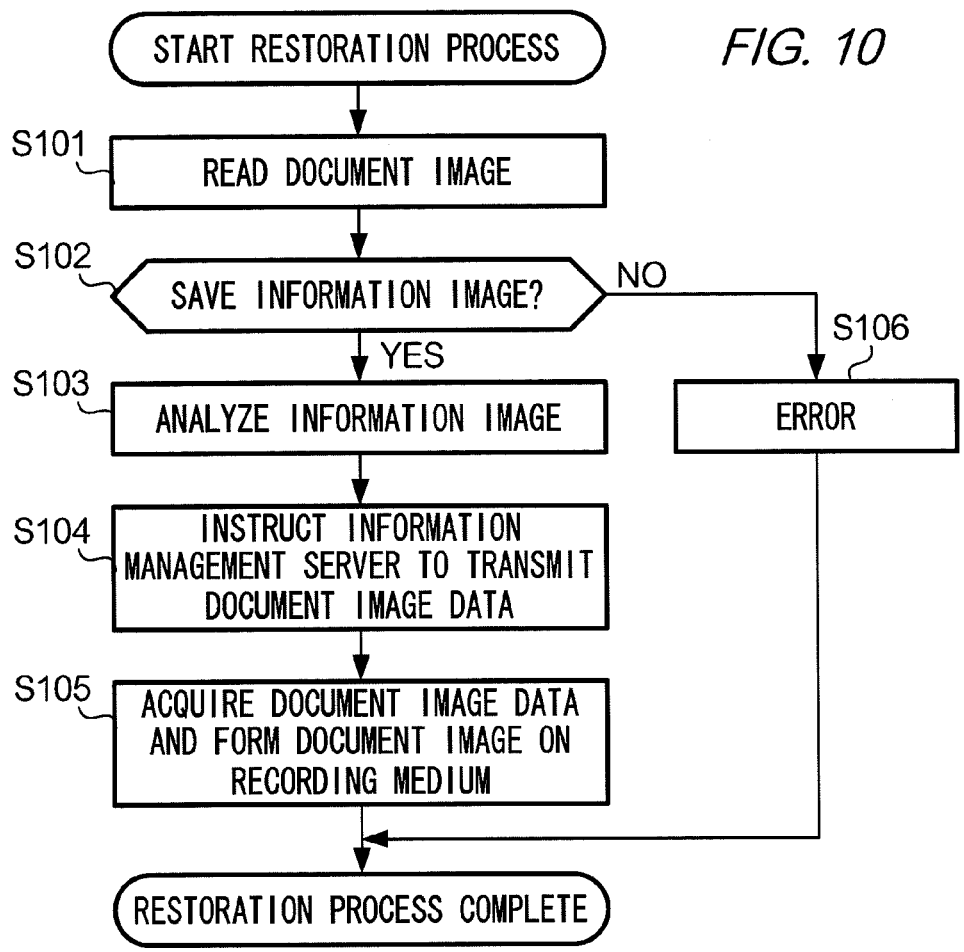
FIG. 10 is a flowchart describing operation of a restoration process of image-forming device 1 related to the exemplary embodiment.

FIG. 10 is an explanatory flowchart showing operation of a restoration process of image-forming device 1 according to the second exemplary embodiment. First, the user selects "restoration process" by operating operation section 13 of image-forming device 1 and causes image reader 16 to read the document image that has been formed on a sheet of recording paper (step S101). Based on the bit-level pixel information read by image reader 16 by scanning the document image, controller 11 determines whether a pixel pattern indicating an information image is present (step S102). If controller 11 determines that a pixel pattern indicating an information image is present (step S102; YES), it retrieves the information image. Next, controller 11 analyzes the retrieved information image to extract both the document ID of the document image data of the original document and the storage address of that document image (step S103). Then, controller 11 transmits a transmission request for the document image data that includes the document ID and the storage address acquired in step S103 from communication sector 15 to information management server 4 (step S104). Information management server 4 transmits the document image data acquired from the document ID and the storage address included in this request to image-forming device 1. When controller 11 receives this document image data from information management server 4, it forms the document image corresponding to the document image data on a sheet of recording paper (step S105). In this way, the user acquires from information management server 4 the document image of the original document, or the document image from the time before the emphasis response process was implemented. In other words, controller 11 of image-forming device 1 is an example of a second acquisition unit that, based on the information represented by the information image included in the overall image, acquires the image data representing the document image in a state in which the differentiation image has not been positioned. In addition, in step S102, if controller 11 determines that a pixel pattern indicating an information image is not present (step S102; NO), it stops the process of acquiring the original document of the document image data from the information management server by inferring that an error has occurred (step S106).

(C) Modified Examples (C-1) Modified Example 1

In the above exemplary embodiments, controller 31 of information-processing device 3 implemented an emphasis response process by operating printer driver 322, but the main body that implements the emphasis response process and the program encoded with the procedure of the emphasis response process are not limited in this way. The procedure of the emphasis response process can be encoded in a program separate from printer driver 322, for example in the document-creation application program stored in information-processing device 3, and moreover, it can be encoded in a computer program stored in image-forming device 1. In the latter case, because image-forming device 1 implements the emphasis response process, it becomes possible, for example, to implement the emphasis response process even for image data representing an image read by image reader 16. Consequently, even when making a copy, it becomes possible to create a copy that allows a person with dichromatic vision or abnormal trichromatic vision to easily discriminate red from other colors.

Moreover, instead of implementing the emphasis response process using controller 31 of information-processing device 3 executing a program that is software, a circuit, such as an ASIC (Application Specific Integrated Circuit) or the like, can be used to implement the emphasis response process without relying on a program.

(C-2) Modified Example 2

The red range can be defined with an arbitrary color space other than a RGB color space as long as it is a red range that is difficult for a person with dichromatic vision or abnormal trichromatic vision to discriminate from other colors. For example, it can be defined within a HLS color space, which expresses colors using the three components of hue, saturation, and lightness. If a HLS color space is used, the red range can be, for example, H=250-255 and 0-8, L=220-255, and S=118-153. In addition, here, H=0°-360° is expressed in 8 bits and is set at H=0-255 (H=0 when H=0°, and H=255 when H=360°). Similarly, S=0 (0%)-1 (100%) is expressed in 8 bits and is set at S=0-255 (S=0 when S=0%, and S=255 when S=100%). Moreover, L=0 (0%)-1 (100%) is expressed in 8 bits and is set at L=0-255 (L=0 when L=0%, and L=255 when L=100%).

(C-3) Modified Example 3

In the exemplary embodiments, the information image is an image encoded with, for example, information indicating that "underlining has been implemented for the red characters" and is a halftone image formed with a transparent toner that is colorless and transparent or a color toner with low visibility (e.g., yellow or cyan), but it is not limited in this way. The information image simply needs to represent information for acquiring the document image in a state in which a differentiation image, such as underlined character trimming, has not been positioned, and can even be an actual character string stating, for example, that "underlining has been implemented for the red characters." Controller 11 of image-forming device 1 specifies the meaning of the character string through character recognition, such as OCR, and furthermore, it specifies a process for erasing the differentiation image positioned within the document image.

Moreover, the information image can be an image encoded with a procedure for a process performed by image-forming device 1 to modify a document image within which a differentiation image is positioned, such as an underlined character trimming, to a state in which the differentiation image is not positioned (e.g., a process procedure for erasing the underlined character trimming implemented for a red character string).

Moreover, the location of an information image positioned on a sheet of recording paper can be any location, and several examples are described below.

(C-3-1) Modified Example 3-1

Figure 11:
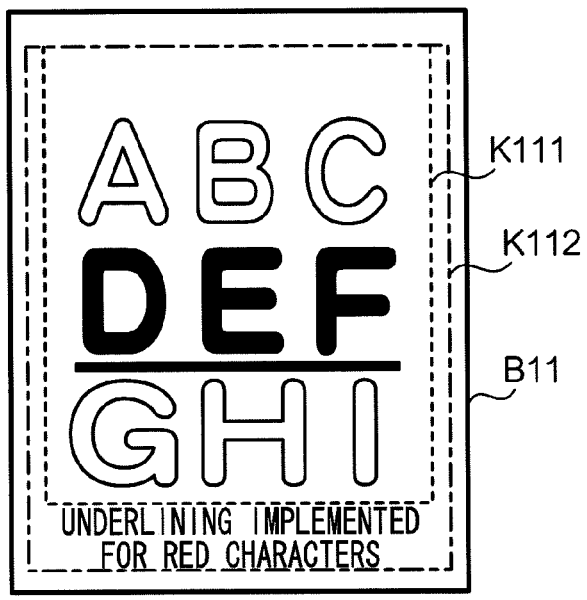
FIG. 11 is an explanatory diagram of an emphasis response process related to a modified example of the exemplary embodiment.

The location where an information image is positioned on a sheet of recording paper can be any location, and it is not limited to an area reserved by the manufacturer of image-forming device 1 as an area for forming an image. Specifically, using document image B11 of FIG. 11 for this explanation, rectangular area K111 is an area that the manufacturer of image-forming device 1 has reserved for the formation of an image (hereinafter referred to as the "reserved printing area"). When default settings are applied to printer driver 322, it is configured to form an image within the range of rectangular area K111. Moreover, rectangular area K112 is an area that the manufacturer of image-forming device 1 has not reserved for the formation of an image (hereinafter referred to as the "non-reserved printing area"), but it is the maximum range within which image-forming device 1 can be used to form an image, and it is an area where printing can be implemented depending on the settings of printer driver 322. By modifying the settings of printer driver 322 and expanding the printable area to the non-reserved printing area when forming an image as part of the emphasis response process, controller 31 can position the information image outside of the range of rectangular area K111 and within the range of rectangular area K112. Based on this system, the probability that the document image and the information image are formed in an overlapping manner is reduced.

(C-3-2) Modified Example 3-2

Figure 12:
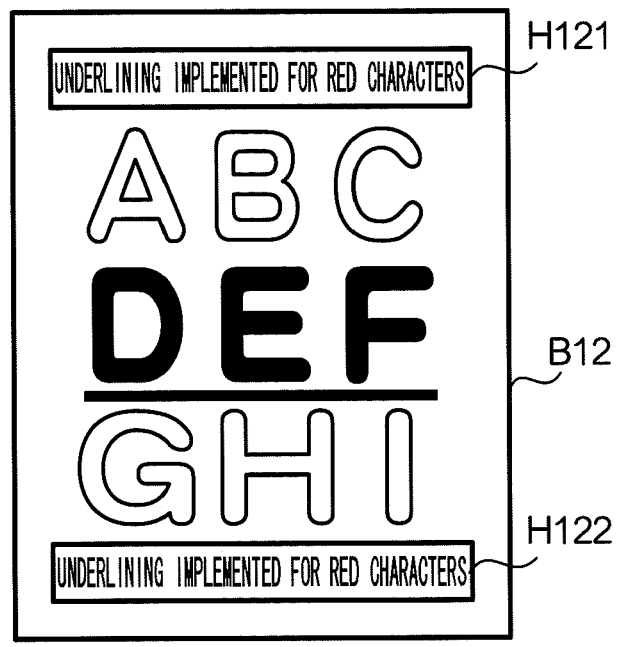
FIG. 12 is an explanatory diagram of an emphasis response process related to a modified example of the exemplary embodiment.

As shown in FIG. 12, the location in which the information image is positioned can be header H121, which is an area reserved above the body text area of the document, or footer H122, which is an area reserved below the input area of the body text.

(C-3-3) Modified Example 3-3

Figure 13:
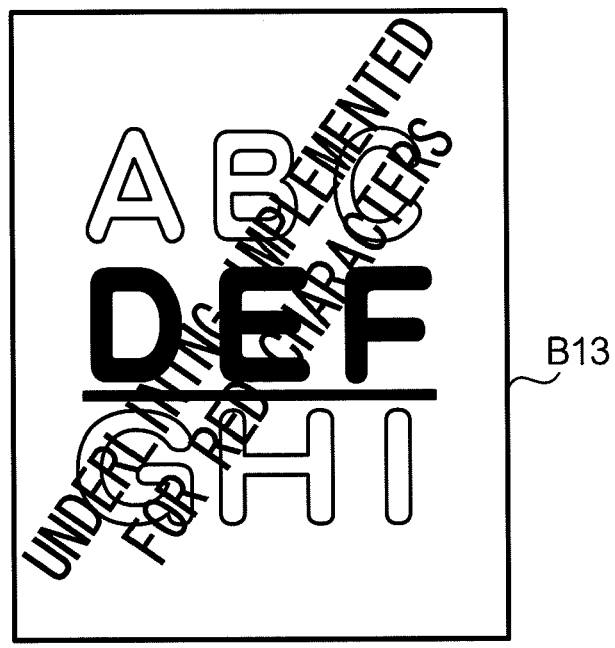
FIG. 13 is an explanatory diagram of an emphasis response process related to a modified example of the exemplary embodiment.

As shown in FIG. 13, the longitudinal direction of the information image can not match the longitudinal direction of the character string of the document included in the document image. Moreover, the color material that forms the information image is not limited to toner types such as, for example, toners that are colorless and transparent, or colored toners.

(C-3-4) Modified Example 3-4

If it is possible to form images on both surfaces of a sheet of recording paper, the position in which the information image is positioned can be on a different surface from the surface on which the image corresponding to the document image is formed.

(C-4) Modified Example 4

In the explanation of FIG. 6, if document image B61, which includes the information image encoded with the information that "underlining has been implemented for the red characters," is being copied, the contents of that information image are analyzed by controller 11 and a message image indicating that "underlining has been implemented for the red characters" is formed on document image B62, but instead of causing the message image indicating that "underlining has been implemented for the red characters" to appear for the first time after copying, both the information image encoded with the information that "underlining has been implemented for the red characters" and the message image that "underlining has been implemented for the red characters" can be included in document image B61.

The foregoing description of the embodiments of the present invention is provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image-processing device comprising:
    a memory that stores a red range occurring within a color space;
    an acquisition unit that acquires image data representing a document image that includes characters; and
    a production unit that produces image data representing an overall image that includes: the document image represented by the image data that is acquired by the acquisition unit, a differentiation image that is positioned within the document image and that allows a user to differentiate an image of red characters residing in the range from an image formed of colors other than red, and an information image representing information for acquiring the document image in a state in which the differentiation image is not positioned.

2. The image-processing device of claim 1, wherein the information image includes an image that represents information specifying a process for erasing the differentiation image that positioned within the document image.

3. The image-processing device of claim 1, wherein the information image includes an image that represents a storage location where image data representing the document image in a state in which the differentiation image is not positioned is stored.

4. An image-processing device comprising:
    a first acquisition unit that acquires image data representing an overall image that includes: a document image that includes characters, a differentiation image that is positioned within the document image and that allows a user to differentiate an image of red characters residing in a predetermined range from an image of characters of colors that do not reside in that range, and an information image that represents information for acquiring the document image in a state in which the differentiation image is not positioned; and
    a second acquisition unit that, based on information represented by the information image included in the overall image represented by the image data, acquires image data that represents the document image in a state in which the differentiation image is not positioned.

5. The image-processing device of claim 4, wherein:
    the information image includes an image that represents information specifying a process for erasing the differentiation image that has been positioned within the document image; and the first acquisition unit includes:
  a specification unit that, based on information represented by the information image included in the overall image represented by the image data that has been acquired, specifies the details of the process for erasing the differentiation image from the overall image, and
  a production unit that implements the process for which the details have been specified by the specification unit and produces image data that represents an image in which the differentiation image has been erased from the overall image.

6. The image-processing device of claim 4, wherein:
the information image includes an image that represents a storage location where image data representing the document image in a state in which the differentiation image is not positioned is stored, and
the second acquisition unit acquires, from the storage location represented by the information image included in the overall image represented by the acquired image data, the image data that is stored in the storage location.

7. An image-forming device comprising:
a memory that stores a red range occurring within a color space;
an acquisition unit that acquires image data representing a document image that includes characters;
a production unit that produces image data representing an overall image that includes:
  a document image represented by the image data acquired by the acquisition unit,
  a differentiation image that is positioned within the document image and that allows a user to differentiate an image of red characters residing in the range from an image formed in colors other than red, and
  an information image that represents information for acquiring the document image in a state in which the differentiation image is not positioned; and
an image formation unit that forms an image corresponding to the image data produced by the production unit in recording media.

8. An image-forming device comprising:
a first acquisition unit that acquires image data representing an overall image that includes:
  a document image that includes characters,
  a differentiation image that is positioned within the document image and that allows a user to differentiate an image of red characters residing in a predetermined range from an image of characters in colors that do not reside within that range, and
  an information image that represents information for acquiring the document image in a state in which the differentiation image is not positioned;
a second acquisition unit that, based on information represented by the information image included in the overall image represented by the image data, acquires image data that represents the document image in a state in which the differentiation image is not positioned; and
an image formation unit that forms an image corresponding to the image data acquired by the second acquisition unit in recording media.

9. A computer-readable storing medium storing a computer program that causes a computer to execute:
storing a red range occurring within a color space;
acquiring image data that represents a document image that includes characters; and
producing image data that represents an overall image that includes:
  a document image represented by the acquired image data,
  a differentiation image that is positioned within the document image and that allows a user to differentiate an image of red characters residing in the range from an image formed of colors other than red, and
  an information image that represents information for acquiring the document image in a state in which the differentiation image is not positioned.

10. A computer-readable storing medium storing a computer program that causes a computer to execute:
acquiring image data that represents an overall image that includes: a document image that includes characters, a differentiation image that is positioned within the document image and that allows a user to differentiate an image of red characters residing in the range from an image of colors other than red, and an information image that represents information for acquiring the document image in a state in which the differentiation image is not positioned; and
acquiring image data that represents the document image in a state in which the differentiation image is not positioned based on the information represented by the information included in the overall image represented by the acquired image data.

* * * * *